US007265920B2

(12) United States Patent  
Boldt

(10) Patent No.: US 7,265,920 B2
(45) Date of Patent: Sep. 4, 2007

(54) MICROSCOPE OBJECTIVE AND METHOD FOR MANUFACTURING A MICROSCOPE OBJECTIVE

(75) Inventor: Andreas Boldt, Dillenburg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/230,818

(22) Filed: Sep. 20, 2005

(65) Prior Publication Data

US 2006/0066943 A1   Mar. 30, 2006

(30) Foreign Application Priority Data

Sep. 30, 2004   (DE)   ............... 10 2004 048 062

(51) Int. Cl.
    *G02B 7/02*    (2006.01)
    *G02B 21/02*   (2006.01)
(52) U.S. Cl. ............... 359/823; 359/368; 359/656; 359/821
(58) Field of Classification Search ........ 359/368–384, 359/656–661, 694–708, 813–824
    See application file for complete search history.

(56) References Cited

U.S. PATENT DOCUMENTS

| | | | |
|---|---|---|---|
| 2,919,626 A * | 1/1960 | Bergmann ............... 359/656 |
| 4,059,342 A | 11/1977 | Tojyo et al. ............. 359/658 |
| 4,953,962 A * | 9/1990 | Esswein et al. ........... 359/660 |
| 5,561,562 A * | 10/1996 | Bender .................. 359/823 |
| 5,856,886 A * | 1/1999 | Kaizu .................... 359/821 |
| 6,023,381 A | 2/2000 | Bender .................. 359/823 |
| 6,661,589 B2 * | 12/2003 | Takanashi et al. ........ 359/819 |
| 6,678,089 B1 | 1/2004 | Engelhardt et al. ....... 359/368 |

FOREIGN PATENT DOCUMENTS

| | | |
|---|---|---|
| DE | 76 02 006 U1 | 3/1979 |
| DE | 40 32 259 A1 | 4/1992 |
| DE | 108 04 470 | 8/1999 |
| DE | 199 31 949 | 1/2001 |
| EP | 0 491 289 | 6/1992 |
| EP | 1 150 153 | 10/2001 |

* cited by examiner

Primary Examiner—Thong Q Nguyen
(74) Attorney, Agent, or Firm—Darby & Darby

(57) ABSTRACT

A microscope objective includes an objective sleeve including a first and a second sub-sleeve. A first lens is received in a first mounting ring, a second lens is received in a second mounting ring, a third lens is received in a third mounting ring, and a fourth lens is received in a fourth mounting ring. The first and second mounting rings are received in the first sub-sleeve and the third and fourth mounting rings are received in the second sub-sleeve.

18 Claims, 1 Drawing Sheet

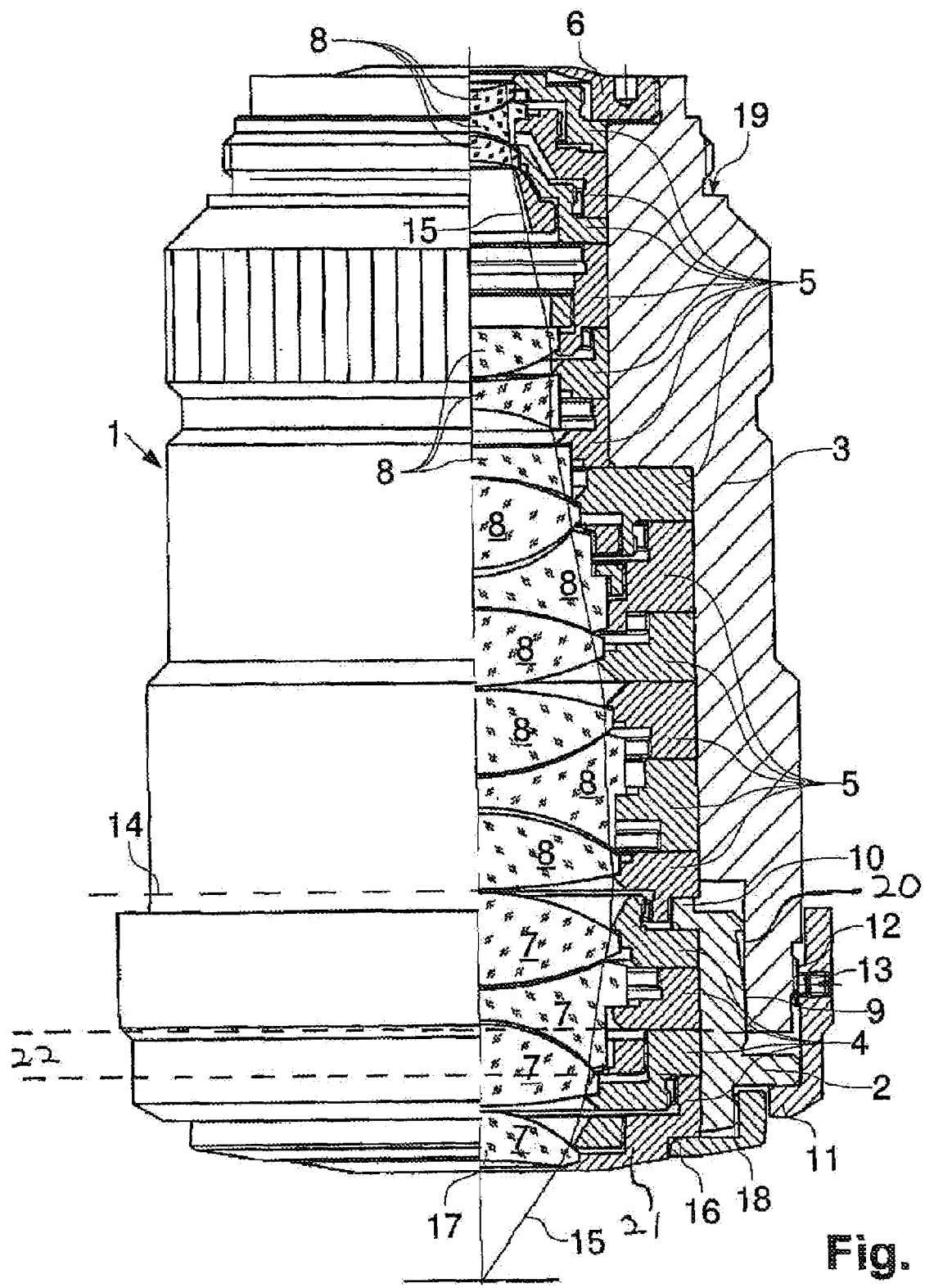

MICROSCOPE OBJECTIVE AND METHOD FOR MANUFACTURING A MICROSCOPE OBJECTIVE

CROSS REFERENCE TO RELATED APPLICATIONS

This application claims priority to German patent application 10 2004 048 062.1, the entire subject matter of which is hereby incorporated by reference herein.

FIELD OF THE INVENTION

The present invention concerns a microscope objective having at least four lenses and an objective sleeve. One lens is mounted in one mounting ring. The objective sleeve receives mounting rings having mounted lenses. The present invention further concerns a method for manufacturing a microscope objective.

BACKGROUND OF THE INVENTION

Microscope objectives of the kind cited initially have been known for some time in the existing art. For production of the microscope objectives, the individual lenses mounted in the mounting rings are introduced into the objective sleeve and in that context fitted, with the result that they can be centered with respect to one another and placed at a definable or desired distance. "Fitting" is understood to mean in particular that the outer cylindrical surface of the mounting ring and the inner cylindrical surface of the objective sleeve are machined in accurately fitting fashion in order to guarantee long-term optical stability of the entire objective. Accurately fitting machining can proceed in this context in an accuracy range on the order of approx. 3 to 5 µm. In this context, lens aberrations are connected out with appropriate setting techniques, so that the overall system exhibits as few aberrations as possible. Correction members, for example in the form of a sliding member, are usually provided in order to correct the objective.

It may also happen, however, that an aberration cannot be corrected using a sliding member. In such a case, mounting ring plus lenses that have already been installed must be removed from the objective sleeve. It may be necessary for almost the entire microscope objective to be disassembled. Some material can then, for example, be removed or machined off from the surface of an appropriate mounting ring, so that the distance from the lens of that mounting ring to the lens of the adjacent mounting ring is decreased.

In microscope objectives having many lenses, all the lenses or lens groups may no longer be readily accessible, especially if the optical calculation defines tight tolerances for the optical system contained therein. The removal and alignment of lenses that have already been fitted is particularly time-consuming, and results in a great deal of rejection of optical components. The assembly of a high-quality microscope objective comprising multiple lenses is therefore very time-consuming, and thus associated with high production costs. It moreover requires a very particular degree of dexterity and patience on the part of the person assembling the microscope objective.

SUMMARY OF THE INVENTION

It is therefore an object of the present invention to provide a microscope objective and a method for manufacturing a microscope objective of the kind cited initially, in which production time can be reduced and in which lenses that have already been fitted are correctable or alignable as easily as possible, even at a later time.

The present invention provides a microscope objective where the objective sleeve comprises at least two sub-sleeves; and that each sub-sleeve receives at least one mounting ring.

The present invention also provides a microscope objective where the objective sleeve comprises at least two sub-sleeves; and that each sub-sleeve receives at least two mounting rings.

What has been recognized according to the present invention is firstly that the elimination of aberrations can be very considerably facilitated in particular by the provision of at least two sub-sleeves, since there is no need to remove from the objective sleeve or the microscope objective all the mounting rings that have already been installed. It is instead possible to remove only individual mounting rings plus lenses grouped together in one sub-sleeve, while the mounting rings plus lenses grouped together in another sub-sleeve do not need to be taken out of the other sub-sleeve. The result of this modular construction of the microscope objective is that in some circumstances, only one module needs to be disassembled. Another module already assembled without errors, or mounting rings with lenses in a different sub-sleeve, can remain unmodified. In the event of a correction, therefore, the production time necessary for mounting an unmodified sub-sleeves makes possible a very considerable simplification in terms of the adjustment and assembly of the microscope objective.

In principle a one-piece objective sleeve could still be provided, into which can be introduced at least two sub-sleeves, into each of which in turn individual mounting rings are introduced. As an alternative to this, another possibility is to provide only at least two sub-sleeves, which in the assembled state form an objective sleeve or perform the function of an objective sleeve. The provision of at least two sub-sleeves very generally creates an additional number of degrees of freedom during assembly and in particular in the context of aberration connection, so that, advantageously, a time savings and (associated therewith) a reduction in cost is achievable thereby. The construction according to the present invention of the microscope objective also offers advantages in terms of any repair of a microscope objective that might need to be performed. If a microscope objective has damage to the front lens, for example, only the sub-sleeve receiving the front lens needs to be removed from the microscope objective. Then only the damaged lenses of that sub-sleeve need to be removed and replaced, so that advantageously, a repair can be performed more quickly and more economically.

BRIEF DESCRIPTION OF THE DRAWINGS

There are various ways of advantageously embodying and refining the teaching of the present invention. The reader is referred to the explanation below of the preferred exemplifying embodiment of the invention with reference to the drawings. In conjunction with the explanation of the preferred exemplifying embodiment of the invention with reference to the drawings, an explanation is also given of generally preferred embodiments and refinements of the teaching. In the drawings, the single FIGURE schematically depicts an exemplifying embodiment according to the present invention in which the left part shows the external view of an objective, and the right part a sectioned view of the objective.

DETAILED DESCRIPTION OF THE INVENTION

In an embodiment, at least one means is provided with which the physical arrangement of at least two sub-sleeves with respect to one another is modifiable. For example, as illustrated by adjustment device 20, a first sub-sleeve could comprise an external thread onto which a second sub-sleeve, adjacent to that first sub-sleeve and having an internal thread, can be screwed. Usefully, the threads will have a shallow pitch so that the spacing of the two sub-sleeves in the axial direction is modifiable merely by rotating them relative to one another. Once the desired spacing or desired relative positioning of the two sub-sleeves has been established, those means could be secured against rotation using conventional means, for example by the provision in a sub-sleeve of a grub screw that, when tightened, comes into contact against the other sub-sleeve. In addition, at least one means could be provided with which the physical arrangement of at least two mounting rings with respect to one another is modifiable. The means could, in this context, comprise design elements from U.S. Pat. No. 6,023,381, the entire subject matter of which is hereby incorporated by reference herein. An "axial direction" is to be understood in this connection as the direction of the optical axis of the microscope objective, and a "radial direction" is to be understood as a direction perpendicular thereto.

In an embodiment, the sub-sleeves are embodied in such a way that they are separable from one another. With a corresponding configuration of the sub-sleeves, this makes a definable region of the microscope objective accessible. This is true on the one hand for assembly during production of the microscope objective, and on the other hand in the context of a possible repair.

The definable region could be a setting distance of the microscope objective. A setting distance in this instance serves in particular for adjusting the spacing of two definable lens surfaces of the microscope objective within a tolerance range defined by the optical design. It refers to at least one optical quality feature or one optical property.

One possible optical quality feature is an aberration of the microscope objective, in particular the spherical aberration, astigmatism, coma, distortion, and/or chromatic aberration. Because these classic aberrations ideally all need to be minimized together in the production of a microscope objective, but in some circumstances depend on one another in the context of a correction, setting distances for several optical quality features are in some cases defined by the optical design.

One possible optical property is, in particular, the focus at a defined working distance of the microscope objective for a defined wavelength of light. In the case of a parfocal microscope objective for inspection microscopy, for example, these could be the two wavelengths 248 nm (for inspection) and 903 nm (for an autofocus module).

By way of a modification of the setting distance of the microscope objective, an aberration is correctable or an optical property of the microscope objective is adjustable. This could be done, for example, by machining one surface or a contact surface of two adjacent mounting rings and/or two adjacent sub-sleeves. It is also conceivable to machine a contact surface of a mounting ring that comes into contact against a sub-sleeve, or to machine a contact surface of a sub-sleeve that comes into contact against a mounting ring. Lathe-turning or, very generally, material-removing machining could be provided as the type of machining.

To ensure that the microscope objective exhibits long-term optical stability, a mounting ring is receivable in a sub-sleeve in substantially accurately fitting fashion. Two adjacent mounting rings received in one sub-sleeve could come directly into contact against one another. "Accurately fitting" in this connection can mean an adaptation of an outside diameter of a mounting ring to an inside diameter of a sub-sleeve with an accuracy in the micrometer range.

The microscope objective according to the present invention could also comprise a spacer sleeve that in turn is receivable in a sub-sleeve in substantially accurately fitting fashion. A spacer sleeve of this kind is to be provided, in particular, when the microscope objective is to comprise a region without lenses or other optical components (e.g. filters, stops); and a definable spacing of the optical components adjacent to the spacer sleeve is to be established.

To ensure that one or more aberrations of a completed microscope objective are correctable at least within definable limits, and/or that, for example, a correction capability for adaptation to different coverslip thicknesses or immersion media is possible, it is preferred if a sub-sleeve comprises a centering and/or sliding member adjustable from outside the microscope objective. This centering or sliding member could, for example, be repeatably displaceable with the aid of a rotatably mounted knurled ring 21 as defined by U.S. Pat. No. 8,023,381. As an alternative to this, it could be adjustable on a one-time basis during production using a grub screw.

In an embodiment, the sub-sleeves are embodied in reversibly assemblable fashion. In a construction of this kind, the completed microscope objective can advantageously be easily and quickly disassembled into its individual modular components at a later time (for example, in the event of a repair). To make possible a relative arrangement of two adjacent sub-sleeves with the highest possible accuracy, in an embodiment two adjacent sub-sleeves are embodied in a manner at least partially complementary to one another. For that purpose, at least one axial and/or radial accurately fitting contact surface could be provided between the two sub-sleeves. For example, one end of a first sub-sleeve is embodied with a first outside diameter. One end of a second sub-sleeve has a larger outside diameter as compared with the first outside diameter, and an inside diameter corresponding substantially to the first outside diameter of the first sub-sleeve. As a result, in the assembled state these two sub-sleeves come into complementary contact in the radial direction. In the axial direction, one end-located surface of the second sub-sleeve could come into contact against a flange, or against a projection having a greater outside radius, of the first sub-sleeve.

In an embodiment, a concrete embodiment of a microscope objective comprises three sub-sleeves. A first setting distance 14 is provided between a sub-sleeve receiving the front lens of the microscope objective and a second sub-sleeve, for the focus at a defined working distance of the microscope objective for a first wavelength of light. This first wavelength of light could be 903 nm, and could serve for autofocusing as defined in U.S. Pat. No. 7,050,223, the entire subject matter of which is hereby incorporated by reference herein. A second setting distance 22 is provided between the second and a third sub-sleeve, for the focus at a defined working distance of the microscope objective for a different wavelength of light. This could be the 248-nm wavelength located in the deep ultraviolet (DUV) region. A microscope objective of this kind is used in an embodiment in wafer inspection for the semiconductor industry; a water immersion microscope objective of this kind has a numerical aperture of 1:20 and thus exhibits particularly high optical resolution. The microscope objective according to the present invention is in this respect suitable for use in an inspection microscope. It can also, however, be used on a light microscope that exhibits a high three-dimensional optical resolution, for example a double confocal scanning microscope as defined in EP 0 491 289 B1 or EP 1 150 153 A1, the entire subject matters of both of which are hereby incorporated by reference herein.

In an embodiment, each two sub-sleeves can be immobilized in terms of their physical arrangement with respect to one another using a coupling ring. The sub-sleeves are accordingly equipped with projections and/or external threads. The coupling ring comprises at least one correspondingly configured internal thread.

The present invention also provides a method for manufacturing a microscope objective characterized in that the mounting rings associated with each sub-sleeve are installed into the sub-sleeve; and that the individual sub-sleeves are put together in order to assemble the entire microscope objective. As already indicated, the modular construction of the microscope objective according to the present invention makes possible assembly of the individual modules or sub-sleeves using mounting rings, in which context a correction of any aberration still present after the individual modules are fitted together to constitute the complete microscope objective can be performed relatively easily and quickly, with no need to disassemble the other module or modules of the microscope objective.

For example, in order to correct an aberration or to adjust an optical property of the microscope objective, the spacing of one sub-sleeve with respect to another sub-sleeve and/or the spacing of one mounting ring of a first sub-sleeve with respect to another mounting ring of a second sub-sleeve could be modified. The individual mounting rings thus do not need to be removed from the sub-sleeves, so that this type of correction can be performed in particularly simple fashion.

If a setting distance of the microscope objective then needs to be modified, in very an embodiment a surface of a mounting ring and/or of a sub-sleeve could be machined. A contact surface of a mounting ring or a sub-sleeve is particularly suitable for this. The machining or modification of the surface itself could be accomplished in material-removing fashion, for example on a lathe.

Microscope objective 1 shown in the FIGURE is provided for use in an inspection microscope. Microscope objective 1 encompasses, according to the present invention, two sub-sleeves, namely a first sub-sleeve 2 and a second sub-sleeve 3. Each of the two sub-sleeves 2, 3 receives a plurality of mounting rings. First sub-sleeve 2 receives four mounting rings 4, and sub-sleeve 3 receives twelve mounting rings 5 and a screw-on ring 6. The lenses respectively held by the four mounting rings 4 are labeled with the reference character 7, and the lenses respectively held by the twelve mounting rings 5 are labeled with the reference character 8.

Sub-sleeve 2 is in contact, from the inside in a radial direction, against sub-sleeve 3 in a region 9. Upper end region 10 of sub-sleeve 2 constitutes a support for the lower mounting ring 5 of sub-sleeve 3.

Sub-sleeve 2 is immobilized on sub-sleeve 3 with coupling ring 11, coupling ring 11 having in an upper region as internal thread that comes into engagement in external thread 12 of sub-sleeve 3. Coupling ring 11 can be secured against rotation with respect to sub-sleeve 3 with the aid of a locking lacquer that can be introduced into orifice 13.

A setting distance 14 is provided between first sub-sleeve 2 and second sub-sleeve 3, and serves to adjust the focus at a defined working distance of microscope objective 1 for a definable light wavelength of 903 nm. If this setting distance 14 needs to be modified, some material is removed by lathe-turning from the lower contact surface of the bottommost mounting ring 5 (which comes into contact against upper end 10 of sub-sleeve 2), or a very thin spacer ring is introduced at that location. Some material could, however, also be removed from the upper contact surface at upper end 10 of sub-sleeve 2.

Reference character 15 identifies the outer edge ray of the light passing through the microscope objective.

Microscope objective 1 according to the present invention is usually assembled as follows:

The first module comprising sub-sleeve 2 is installed by introducing mounting rings 4 successively into sub-sleeve 2 from below. The four mounting rings 4 are immobilized in sub-sleeve 2 using coupling ring 16, the surface of coupling ring 16 arranged inside at the top constituting the support for mounting ring 4 of front lens 17. Coupling ring 16 comprises an internal thread that comes into engagement with external thread 18 of sub-sleeve 2.

The lower six mounting rings 5 are inserted from below into sub-sleeve 3. The upper six mounting rings 5 are inserted from above into sub-sleeve 3, and come into contact at the top in the axial direction by way of screw-on ring 6 screwed into sub-sleeve 3. Sub-sleeve 3 having mounting rings 5 can now be placed onto sub-sleeve 2. If the distance between front lens 17 and stop surface 19 of microscope objective 1 against the microscope (not shown in the FIGURE) needs to be modified, some material can simply be removed from step surface 19.

In conclusion, it should be emphasized that microscope objective 1 shown in the FIGURE is constructed in modular fashion, thus making possible, in advantageous fashion, rapid and easy access to setting distance 14, since all that is necessary for the purpose is to loosen or remove coupling ring 11. This is advantageous especially for any repair of microscope objective 1 that may need to be provided for, since only the module that is damaged needs to be removed and replaced.

In conclusion, be it noted that the exemplifying embodiment discussed above serves merely to describe the teaching claimed, but does not limit it to the exemplifying embodiments.

PARTS LIST

1 Microscope objective
2 First sub-sleeve
3 Second sub-sleeve
4 Mounting rings in (2)
5 Mounting rings in (3)
6 Screw-on ring
7 Lens respectively held by a mounting ring (4)
8 Lens respectively held by a mounting ring (5)
9 Contact region between (2) and (3)
10 Upper end region of (2) on which bottommost mounting ring (5) rests
11 Coupling ring
12 External thread of sub-sleeve (3)
13 Orifice in (11)
14 Setting distance
15 Outer edge ray
16 Coupling ring
17 Front lent 18 External thread of sub-sleeve (2)
19 Stop surface of (3) against microscope
20 Adjustment device—threaded region between sub-sleeve (2) and sub-sleeve (3)
21 Third sub-sleeve
22 Second setting distance

What is claimed is:

1. A microscope objective comprising:
an objective sleeve including a first sub-sleeve and a second sub-sleeve, the first and second sub-sleeves being separable from one another so as to enable an adjustable setting distance;
a first lens received in a first mounting ring and a second lens received in a second mounting ring;
wherein the first mounting ring is received in the first sub-sleeve and the second mounting ring is received in the second sub-sleeve, and the adjustable setting distance is defined by a spacing of two definable lens surfaces of the microscope objective.

2. The microscope objective as recited in claim 1 further comprising an adjustment device configured to adjust at least one of an arrangement of the first and second sub-sleeves with respect to one another and an arrangement of the mounting rings with respect to one another.

3. The microscope objective as recited in claim 1 wherein the setting distance is defined by a spacing of two definable lens surfaces of the microscope objective in a tolerance range defined by an optical design thereof with reference to at least one optical quality property.

4. The microscope objective as recited in claim 3 wherein the optical quality property is an aberration of the microscope objective.

5. The microscope objective as recited in claim 4 wherein aberration is at least one of a spherical and a chromatic aberration.

6. The microscope objective as recited in claim 3 wherein the optical quality property is a focus at a defined working distance of the microscope objective for a defined wavelength of light.

7. The microscope objective as recited in claim 6 wherein the defined wavelength is 248 nm or 903 nm.

8. The microscope objective as recited in claim 3 wherein the setting distance is adjustable so as to correct an aberration of the microscope objective or adjust an optical property of the microscope objective.

9. The microscope objective as recited in claim 1 further comprising a third lens received in a third mounting ring and a fourth lens received in a fourth mounting ring, wherein the third mounting ring is received in the first sub-sleeve and the fourth mounting ring is received in the second sub-sleeve.

10. The microscope objective as recited in claim 9 wherein the first and third mounting rings are disposed so as to contact one another.

11. The microscope objective as recited in claim 1 wherein the first mounting ring is received in the first sub-sleeve in a substantially accurately fitting fashion.

12. The microscope objective as recited in claim 1 wherein the sub-sleeves are at least one of reversibly assemblable and at least partially complementary to one another.

13. The microscope objective as recited in claim 1 further comprising a third sub-sleeve, and wherein:
the first lens is a the front lens of the microscope objective;
a first setting distance is provided between the first sub-sleeve and the second sub-sleeve for a first focus at a first defined working distance of the microscope objective for a first wavelength of light; and
a second setting distance is provided between the second sub-sleeve and the third sub-sleeve for a second focus at a second defined working distance of the microscope objective for a second wavelength of light.

14. The microscope objective as recited in claim 13 wherein the first wavelength of light is 903 nm and the second wavelength of light is 248 nm.

15. The microscope objective as recited in claim 1 further comprising a coupling ring configured to immobilize the two sub-sleeves relative to one another.

16. A method for making a microscope objective, the method comprising:
providing a first sub-sleeve and a second sub-sleeve;
receiving a first lens in a first mounting ring and a second lens in a second mounting ring;
receiving the first mounting ring in the first sub-sleeve and the second mounting ring in the second sub-sleeve;
disposing the first and second sub-sleeves together so as to form an objective sleeve so as to form the microscope objective; and
changing at least one of a spacing of the first and second sub-sleeves relative to one another and a spacing of the first and second mounting rings relative to one another so as to correct an aberration or to adjust an optical property of the microscope objective.

17. The method as recited in claim 16 further comprising:
receiving a third lens in a third mounting ring and a fourth lens in a fourth mounting ring; and
receiving the third mounting ring in the first sub-sleeve and the fourth mounting ring in the second sub-sleeve.

18. The method as recited in claim 16 further comprising changing a setting distance of the microscope objective by machining a surface of at least one of the first mounting ring and the second sleeve.

* * * * *